BLOCK COPOLYMERS AND A METHOD FOR PRODUCING THE SAME

Tadashi Yamaguchi, Sendai-shi, and Tomio Goto, Shiogama-shi, Japan, assignors to Idemitsu Kosan Co., Ltd., Tokyo, Japan
No Drawing. Continuation of abandoned application Ser. No. 835,755, June 23, 1969. This application Apr. 26, 1971, Ser. No. 137,663
Claims priority, application Japan, July 16, 1968, 43/49,668
Int. Cl. C08f 15/18, 15/36, 15/40
U.S. Cl. 260—879                                    4 Claims

ABSTRACT OF THE DISCLOSURE

Novel block copolymer, block copolymers having two or more polymer chains, each of which consists of the repetition of anionically polymerized monomer unit which is selected from two kinds or more of the anionically polymerizable monomers, and which is initiated by the compounds obtained by metallizing the functional groups of the compounds having two kinds or more of metallizable functional groups and method for producing the same.

RELATED CASE

This application is a continuation of Ser. No. 837,755, filed June 23, 1969, now abandoned.

DESCRIPTION

This invention relates to novel block copolymers and a method for producing the same which comprises subjecting two kinds or more of the anionically polymerizable monomers classified into two or more groups, to stepwise anionic polymerization according to the classification of the said monomers by using, as polymerization initiators, the compounds obtained by metallizing the functional groups of the compounds having two kinds or more of metallizable functional groups including active methyl, active methylene and active methine groups. Accordingly, the conventionally known type of block copolymers which are derived from so-called living polymers is not included in the type of the block copolymers in the present invention.

The representative metallizable functional groups of the present invention include hydroxyl, amino, carbamino, mercapto, sulfonic, nitro, nitroso, carboxyl, carbonyl and thiocarbonyl groups, and halogen radicals, besides active methyl, active methylene and active methine groups.

As examples of the compounds having such two kinds or more of functional groups, acetylene alcohols, aminoalcohols, hydroxy acids, indene derivatives, fluorene derivatives, amino acid derivatives, diphenylmethane derivatives, triphenyl methane derivatives or the like can be enumerated.

The metallization of these functional groups is carried out by using such alkali metals as lithium, sodium, potassium or the like in liquid ammonia or other solvents for metallization.

It is also possible to use alkaline earth metals besides the above-mentioned alkali metals.

As for the monomers, all the monomers that are generally used in anionic polymerizations, such as styrene, methyl methacrylate, acrylonitrile, butadiene or the like can be the monomeric components of the block copolymers of the present invention.

As for the polymerization solvents, all the solvents that can be used in the general anionic polymerizations, such as tetrahydrofuran, benzene, toluene and normal paraffins, are available in the present invention. It is also possible to effect the polymerization in the absence of a solvent.

It has been found in the present invention that the structures of the block copolymers are determined by correlation of the mutual relation (I) among the metallized functional groups with the mutual relation (II) among monomers used in the polymerization. In addition to this, the structures and pKa (III) of the compounds used as polymerization initiators are also the factors which determine the structure of the block copolymers.

More specifically, the above-mentioned mutual relation (I) is the degree of basicity, and (II) is the degree of acidity. The degree of acidity i.e., (II) can be expressed by the value of e brought forward by Alfrey and Price. Accordingly, in connection with (I) and (II) under consideration of (III), what kind of monomer can be anionically polymerized and at which of the metallized functional groups as a site for the initiation of polymerization are determined theoretically.

More clearly, a monomer of low acidity in the relation (II) can be polymerized only at metallized functional groups of very high basicity in the relation of (I) as the site for the initiation of polymerization. A monomer of high acidity in (II) can be polymerized at the metallized functional groups of high basicity as well as those of very high basicity in (I) as the site for the initiation of polymerization. A monomer of very high acidity in (II) can be polymerized at the metallized functional groups having high and low basicity, besides those of very high basicity, as the site for the initiation of polymerization.

Therefore, the structure of the block copolymer of the present invention is determined depending upon the using order of the monomers.

For example, in case of a compound having an active methylene, an amino and a hydroxyl group (hereinafter abbreviated as

it is well known that the degrees of basicity are in the order of $>$CHNa$>$ —NHNa$>$ —ONa. When styrene (hereinafter abbreviated as $M_1$), methyl methacrylate (hereinafter abbreviated as $M_2$) and acrylonitrile (hereinafter abbreviated as $M_3$) are provided as the monomers for an anionic polymerization, the values of $e$ of these monomers are —0.8, +0.4 and +1.2 respectively, and the degrees of the acidity are in the order of $M_1 < M_2 < M_3$. Thus, the polymerization of $M_1$ is initiated only by $>$CHNa, the polymerization of $M_2$ is initiated by $>$CHNa and —NHNa, and the polymerization of $M_3$ is initiated by $>$CHNa, —NHNa, and —ONa. In this case, the procedure of the production of a typical block copolymer is as follows:

When $M_1$ is used in the first step polymerization, the polymerization is initiated by $>$CHNa to afford the following equation:

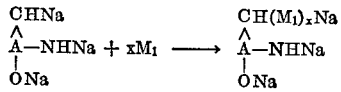

When $M_2$ is used in the second step polymerization, the polymerization is initiated to afford the equation below, since —NHNa only remains as the party at which the polymerization can be initiated:

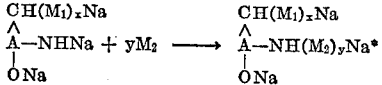

When $M_3$ is used in the last step polymerization, the polymerization is initiated to afford the equation below, ---
*Self-termination is observed ordinarily.

since —ONa only remains as the party at which the polymerization can be initiated:

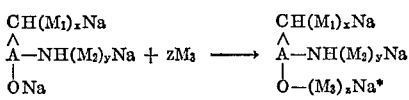

Further, on the side of the monomers, those having the same e-values or the e-values very close to each other can be used simultaneously in a step polymerization to effect copolymerization in the presence of a given metallized functional group. As such monomers, styrene and butadiene can be enumerated. These have the same e-value of —0.8.

After polymerization, the homopolymers partly formed from the monomers can be removed by dissolving with a proper solvent and thus block copolymer can be purified.

The novel block copolymers in this invention have the unique properties that have not been possessed by the conventional synthetic resins and have wide application fields of shaped articles and coating compositions etc.

The present invention may be more fully understood from the following examples that are offered by way of illustration and not by way of limitation.

Example 1

As a compound having two kinds of metallizable functional groups, 19 mg. of 1-hydroxy-2-aminoethane was selected and metallized by potassium amide dissolved in 10 cc. of liquid ammonia. After removing liquid ammonia, 3.3 g. of methyl methacrylate was added and polymerized by the resulting polymerization initiator at —60° C. for 3 hours, and then 2.9 g. of acrylonitrile was added and polymerized at room temperature for 10 hours, whereby 2.1 g. of a polymer was obtained. When the purification with benzene was effected, 0.3 g. of the homopolymer of methyl methacrylate was eliminated.

As a result, 1.8 g. of a block copolymer, wherein methyl methacrylate was polymerized at the amino radical and acrylonitrile was polymerized at the hydroxyl radical, was obtained.

Example 2

As a compound having two kinds of metallizable functional groups, 42 mg. of malonic amide was selected and metallized as in Example 1. To this, 10 cc. of tetrahydrofuran was poured as a solvent and 2.0 g. of styrene was added and polymerized at room temperature for 24 hours. Then, 1.0 g. of methyl methacrylate was added and polymerized at room temperature for 24 hours. Thereafter, the remaining metallized functional groups were inactivated by a small amount of ethyl alcohol. Further, reprecipitation was carried out with ethyl alcohol in order to remove only the homopolymers for the purification of the block copolymer.

Thus, 2.0 g. of the purified block copolymer was obtained. The product consisted of the only block copolymer containing no cyclohexane nor acetonitrile-soluble parts, which means that no homopolymer remained in it.

This block copolymer had a structure in which styrene was polymerized at the methylene radical and methyl methacrylate was polymerized at the two carbamino radicals, the molar ratio of styrene to methyl methacrylate as a whole being equal to 1.45:1.00.

Example 3

As a compound having three kinds of metallizable functional groups, 70 mg. of p-amino-p'-hydroxy-triphenyl methane was selected and metallized as in Example 1. To this, 6 cc. of tetrahydrofuran was poured as a solvent and 2.7 g. of styrene was added and polymerized at 20° C. for 12 hours, and then 2.6 g. of methyl methacrylate was added and polymerized at 20° C. for 12 hours, and finally 1.4 g. of acrylonitrile was added and polymerized at 0° C. for 12 hours. Thereafter, reprecipitation was carried out with ethyl alcohol to purify the block copolymer, whereby 5.2 g. of a product was obtained. The product consisted of a block copolymer containing no cyclohexane- nor acetonitrile-soluble parts, which means that no homopolymer remained in it.

This block copolymer had a structure in which styrene was polymerized at methine radical and methyl methacrylate was polymerized at the two amino radicals and acrylonitrile was polymerized at hydroxyl radical, the molar ratio of styrene to methyl methacrylate to acrylonitrile as a whole being equal to 1.0:1.5:1.6.

Example 4

As a compound having two kinds of metallizable functional groups, 46 mg. of p-amino diphenylmethane was selected and metallized as in Example 1. To this, 4.0 g. of the equimolar mixture of styrene and butadiene was added and polymerized at 20° C. for 24 hours, and then 2.5 g. of methyl methacrylate was added and polymerized at 20° C. for 15 hours, whereby 4.8 g. of a polymer was obtained. It was then subjected to purification with benzene to remove 0.4 g. of the homopolymer of methyl methacrylate. As a result, 4.1 g. of a block copolymer was obtained. This block copolymer had a structure in which styrene and butadiene were polymerized at the methylene radical and methyl methacrylate was polymerized at the amino radical.

Example 5

As a compound having two kinds of metallizable functional groups, 36 mg. of α-cyanoacetamide was selected and metallized as in Example 1. To this, 3.7 cc. of dimethyl formamide was poured as a solvent and 2.09 g. of styrene was added and polymerized at 11–12° C. for 20 days, and then 2.14 g. of methyl methacrylate was added and polymerized at 11–12° C. for 9 days and the remaining metallized functional groups were inactivated by adding a small amount of ethyl alcohol. The purification of a block copolymer was carried out by the successive extractions with acetonitrile and cyclohexane, and 0.15 g. of a copolymer was obtained. The copolymer had a structure in which styrene was polymerized at the methylene radical and methyl methacrylate was polymerized at the carbamino radical.

Example 6

As a compound having two kinds of metallizable functional groups, 57 mg. of 3-amino-1-propanol was selected and metallized as in Example 1. 3.5 g. of methyl methacrylate was added and polymerized by the resulting polymerization initiator at room temperature for 20 hours, and then 1.9 g. of acrylonitrile was polymerized at room temperature for 24 hours, whereby 4.1 g. of a polymer was obtained. By subjecting to benzene extraction, 2.3 g. of the homopolymer of methyl methacrylate was eliminated. As a result, 1.8 g. of a block copolymer in which methyl methacrylate was polymerized at the amino radical and acrylonitrile was polymerized at the hydroxyl radical, was obtained.

Example 7

As a compound having two kinds of metallizable functional groups, 74 mg. of 1-amino-2-propanol was selected and metallized as in Example 1. To this, 4.6 g. of methyl methacrylate was added and polymerized at room temperature for 18 hours, and then 2.4 g. of acrylonitrile was added and polymerized at room temperature for 20 hours, whereby 6.0 g. of a polymer was obtained. The amount of the block copolymer in which methyl methacrylate was polymerized at the amino radical and acrylonitrile was polymerized at the hydroxyl radical, was 2.7 g.

Example 8

As a compound having two kinds of metallizable functional groups, 37 mg. of 3,9-bis(3-aminopropyl)-2,4,8,10-tetroxaspiro[5,5]undecane was selected and metallized as

*Self-termination is observed ordinarily.

in Example 1. To this, 1.6 g. of styrene was added and polymerized at room temperature for 11 days, and then 1.5 g. of methyl methacrylate was added and polymerized at −60° C. for 5 hours, whereby 2.0 g. of polymer was obtained. After purification by extractions with acetonitrile and with cyclohexane, 1.1 g. of a block copolymer in which styrene was polymerized at the methine radical and methyl methacrylate was polymerized at the amino radical, was obtained.

Example 9

As a compound having two kinds of metallizable functional groups, 59 mg. of propargyl alcohol was selected and metallized as in Example 1. To this, 3.9 g. of styrene was added and polymerized at room temperature for 6 days, and then 2.0 g. of acrylonitrile was added and polymerized at room temperature for 2 days, whereby 0.95 g. of polymer was obtained. By extraction with benzene from the polymer, 85 mg. of the homopolymer of styrene was removed. As a result, 0.87 g. of a block copolymer in which styrene was polymerized at the methine radical and acrylonitrile was polymerized at the hydroxyl radical, was obtained.

Example 10

As a compound having two kinds of metallizable functional groups, 82 mg. of propargyl alcohol was selected and metallized by lithium amide prepared in liquid ammonia. After removing the liquid ammonia, 7.6 g. of styrene was added and polymerized by the resulting initiator at room temperature for 7 days, and then 3.9 g. of acrylonitrile was polymerized at room temperature for 14 days, whereby 3.5 g. of a polymer was obtained. By the extraction with benzene, 0.14 g. of the homopolymer of styrene was removed. As a result, 3.4 g. of a block copolymer in which styrene was polymerized at the methine radical and acrylonitrile was polymerized at the hydroxyl radical, was obtained.

We claim:

1. A method of producing novel block copolymers which comprises subjecting at least two anionically polymerizable monomers to sequential anionic polymerization in the presence of a polymerization initiator, said method being characterized by:
    (a) carrying out the polymerization in at least two sequential monomer addition steps, and at a temperature from −60° C. to room temperature, either in the presence or absence of an organic solvent,
    (b) the monomers used in said sequential steps being different from each other and the acidity of the monomer of the first polymerization step being less than the acidity of the monomer of the next succeeding polymerization step,
    (c) said polymerization initiator being a metallized reaction product between
        (1) a compound which is selected from the group consisting of propargyl alcohol, 1 - hydroxy-2-aminoethane, 3 - amino-1-propanol, 1-amino-2-propanol, malonic amide, α-cyanoacetoamide, 3,9 - bis-(3-amino-propyl)-2,4,8,10-tetroxaspiro [5,5]undecane, p-amino-diphenylmethane, and (p-amino-p'-hydroxytriphenylmethane) and
        (2) an alkali metal or alkaline earth metal or alkali metal amides in liquid ammonia,
    (d) said anionically polymerizable monomers being selected from the group consisting essentially of styrene, methyl methacrylate, acrylonitrile and butadiene.

2. The method according to claim 1 wherein the alkali metal set forth in (c) is selected from the group consisting essentially of lithium and potassium.

3. The method according to claim 1 wherein said compounds having at least two kinds of metallizable functional groups are metallized by contacting said compounds having at least two kinds of metallizable functional groups with metal selected from the group consisting essentially of alkali metals and the alkaline earth metals to produce said polymerization initiator.

4. The method according to claim 1 wherein said compounds having at least two kinds of metallizable functional groups are metallized by contacting said compounds having at least two kinds of metallizable functional groups with a member selected from the group consisting essentially of lithium and potassium and the amides thereof, said member being dissolved in liquid ammonia, to produce said polymerization initiator.

References Cited
UNITED STATES PATENTS

| | | | |
|---|---|---|---|
| 3,451,988 | 6/1969 | Langer | 260—94.6 |
| 3,609,101 | 9/1971 | Niemann | 260—881 X |

JOSEPH L. SHOFER, Primary Examiner

W. F. HAMROCK, Assistant Examiner

U.S. Cl. X.R.

260—880 B, 881, 885, 886